(12) United States Patent
Kim et al.

(10) Patent No.: US 8,332,945 B2
(45) Date of Patent: Dec. 11, 2012

(54) SYSTEM AND METHOD FOR DETECTING ENERGY CONSUMPTION ANOMALIES AND MOBILE MALWARE VARIANTS

(75) Inventors: Hahnsang Kim, Ann Arbor, MI (US); Kang G. Shin, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 315 days.

(21) Appl. No.: 12/793,929

(22) Filed: Jun. 4, 2010

(65) Prior Publication Data

US 2010/0313270 A1 Dec. 9, 2010

Related U.S. Application Data

(60) Provisional application No. 61/184,490, filed on Jun. 5, 2009.

(51) Int. Cl.
| | |
|---|---|
| G06F 11/30 | (2006.01) |
| G06F 12/14 | (2006.01) |
| G06F 12/16 | (2006.01) |
| G08B 23/00 | (2006.01) |
| G06F 1/00 | (2006.01) |

(52) U.S. Cl. ............... 726/24; 713/188; 713/340
(58) Field of Classification Search ........... 726/22–25; 713/188, 340
See application file for complete search history.

(56) References Cited

U.S. PATENT DOCUMENTS

| | | | | |
|---|---|---|---|---|
| 7,590,956 | B1 * | 9/2009 | Trimberger | 716/136 |
| 7,877,621 | B2 * | 1/2011 | Jacoby et al. | 713/340 |
| 8,108,933 | B2 * | 1/2012 | Mahaffey | 726/25 |
| 2007/0180528 | A1 * | 8/2007 | Kane | 726/24 |
| 2008/0276111 | A1 | 11/2008 | Jacoby et al. | |
| 2009/0019546 | A1 * | 1/2009 | Park et al. | 726/24 |
| 2009/0049549 | A1 * | 2/2009 | Park et al. | 726/22 |
| 2009/0165137 | A1 * | 6/2009 | Yoo et al. | 726/24 |
| 2009/0282483 | A1 * | 11/2009 | Bennett | 726/23 |
| 2010/0064370 | A1 * | 3/2010 | Thiebeauld de la Crouee et al. | 726/24 |

FOREIGN PATENT DOCUMENTS

WO  WO 2006/028558 A1 *  3/2006

OTHER PUBLICATIONS

Hahnsang Kim et al. MODELZ: Monitoring, Detection, and Analysis of Energy-Greedy Anomalies in Mobile Handsets. Jul. 2011. IEEE. p. 968-981.*
Lei Liu et al. VirusMeter: Preventing Your Cellphone from Spies. Sep. 2009. Springer-Verlag Berlin Heidelberg. p. 244-264.*
Qiang Yan. Insights into Malware Detection and Prevention on Mobile Phones. Dec. 10-12, 2009. Springer-Verlag Berlin Heidelberg. p. 242-249.*
Kim, H. et al. "Detecting Energy-Greedy Anomalies and Mobile Malware Variants", 6th Int. Conf. on Mobile Systems, Applications and Services (MobiSys' 08), New York 2008.

* cited by examiner

Primary Examiner — Christian Laforgia
(74) Attorney, Agent, or Firm — Harness, Dickey & Pierce, P.L.C.

(57) ABSTRACT

A system is presented for detecting malware applications residing on a mobile device powered by a battery. The system includes a power monitoring module, a data analysis module and a data store that stores a plurality of known power signatures signifying a power consumption anomaly. The power monitoring module measures power drawn from the battery and the data analysis module extracts a power history signature from the power measures. The data analysis module then compares the power history signature with the plurality of known power signatures and initiates a protective operation if the power history signature is closely correlated to one or more of the known power signatures.

28 Claims, 12 Drawing Sheets

SYSTEM AND METHOD FOR DETECTING ENERGY CONSUMPTION ANOMALIES AND MOBILE MALWARE VARIANTS

CROSS-REFERENCE TO RELATED APPLICATIONS

This claims the benefit of U.S. Provisional Application No. 61/184,490, filed on Jun. 5, 2009. The entire disclosure of the above application is incorporated herein by reference.

GOVERNMENT CLAUSE

This invention was made with government support under grant CNS0523932 awarded by the National Science Foundation. The government has certain rights in this invention.

FIELD

The present disclosure relates to a system and method for detecting energy greedy anomalies and malware variants on a mobile device using the power usage of a device as an indicator thereof.

BACKGROUND

In recent years, the worldwide market for handhelds has grown dramatically. For instance, in 2006 the market grew by 21% over 2005, selling 800 million mobile phones, and in 2007 1.1 billion mobile phones were estimated to have been sold worldwide. Because of continued miniaturization, ubiquitous communication, and increasing computation power, mobile handheld users can now perform many online tasks, including web browsing, document editing, multimedia streaming, and Internet banking. At the same time, the growing use of mobile handhelds for everyday life and business has been attracting the attention of malware writers, whose aim is to compromise data confidentiality, integrity, and the ability to use handheld services. For instance, SymbOS.Cabir ("Cabir"), the first proof-of-concept mobile worm developed in June 2004, was written for the Symbian OS and used a novel propagation vector (e.g., via Bluetooth or SMS). Although Cabir was designed solely to demonstrate the feasibility of malicious code for mobile devices, the publication of Cabir source code triggered a worldwide outbreak of many variants, infecting Bluetooth-enabled mobile phones.

The limited battery-lifetime for mobile handhelds is an Achilles' heel for the portability and the ubiquitous use of mobile devices. This limitation exists not only because battery technology has not kept up with Moore's Law, but also mobile devices and software running thereon demand more power for a longer period than the battery can deliver. At the same time, while most malicious code attacks on handhelds aim to damage software resources such as infecting files and stealing privacy information, intentional abuse of hardware resources (e.g., CPU, memory, battery power) has become an important, increasing threat. In particular, malware targeting the burning/depletion of battery power are extremely difficult to detect and prevent, mainly because users are usually unable to recognize this type of anomaly on their handhelds and the battery can be deliberately and rapidly drained in a number of different ways (e.g., DoS attacks or the installation of animated GIFs). Despite these problems, only limited research has focused on the detection and prevention of battery-draining attacks on handhelds, including how to cope with a wider variety of attacks.

The most commonly-used technique for malware mitigation for antivirus and anti-spyware is signature-based analysis. Signatures are created using static information (e.g., file name and a code value), and as such are vulnerable to simple obfuscation, polymorphism, and packing techniques. Signature-based detection that requires a new signature for every single malware variant is not well suited for mobile handhelds, however, mainly because handhelds have much less resources (e.g., CPU, memory, and battery power) than their desktop counterparts. Moreover, even 'old' malware can harm new handhelds unless their system has been properly patched in a timely fashion. In practice, patching is rarely an option for handhelds as their operating systems are usually inaccessible to others (except the manufacturers).

Unlike signature-based detection, anomaly-based detection compares definitions of the activity considered normal in a profile against the observed events to identify significant deviations. The profile describes the normal behavior, e.g. users, hosts, applications, or network connections. One common problem with anomaly-based detection, though, is that the inadvertent inclusion of a malicious activity as part of the profile produces many false-negative situations, i.e. failure to identify malicious activities.

Similarly, behavioral detection is based on behavioral signatures that describe aspects of any particular worm's behavior such as sending similar data from one machine to another, the propagation pattern, and the change of a server into a client, thus representing a generic worm propagation model. These behavioral signatures that are not sufficiently complex to reflect real-world computing activities may also cause many false-positives, i.e. incorrect identification of a benign activity as malicious. Also, the propagation of mobile malware via non-traditional exploit vectors such as SMS and Bluetooth in conjunction with user mobility renders network-behavioral signatures almost ineffective.

In sum, there are two main challenges in developing a malware-detection framework for handhelds. First, a detection framework should be able to detect diverse types of malware, especially including energy-greedy (malicious) applications and malware variants, keeping both false-negatives and false-positives below a certain acceptable threshold. Second, unlike resource-rich PCs, a detection framework on battery-powered handhelds should not consume too much of the device resources, including CPU, memory, and battery power. The overhead for executing the detection framework should be kept to a minimum.

This section provides background information related to the present disclosure which is not necessarily prior art.

SUMMARY

A system is presented for detecting malware applications residing on a mobile device powered by a battery. The system includes a power monitoring module, a data analysis module and a data store that stores a plurality of known power signatures signifying power consumption anomalies. The power monitoring module measures power drawn from the battery and the data analysis module extracts a power history signature from the power measures. The data analysis module then compares the power history signature with the plurality of known power signatures and initiates a protective operation if the power history signature is closely correlated to one or more of the known power signatures. This section provides a general summary of the disclosure, and is not a comprehensive disclosure of its full scope or all of its features.

DRAWINGS

Figure 1:
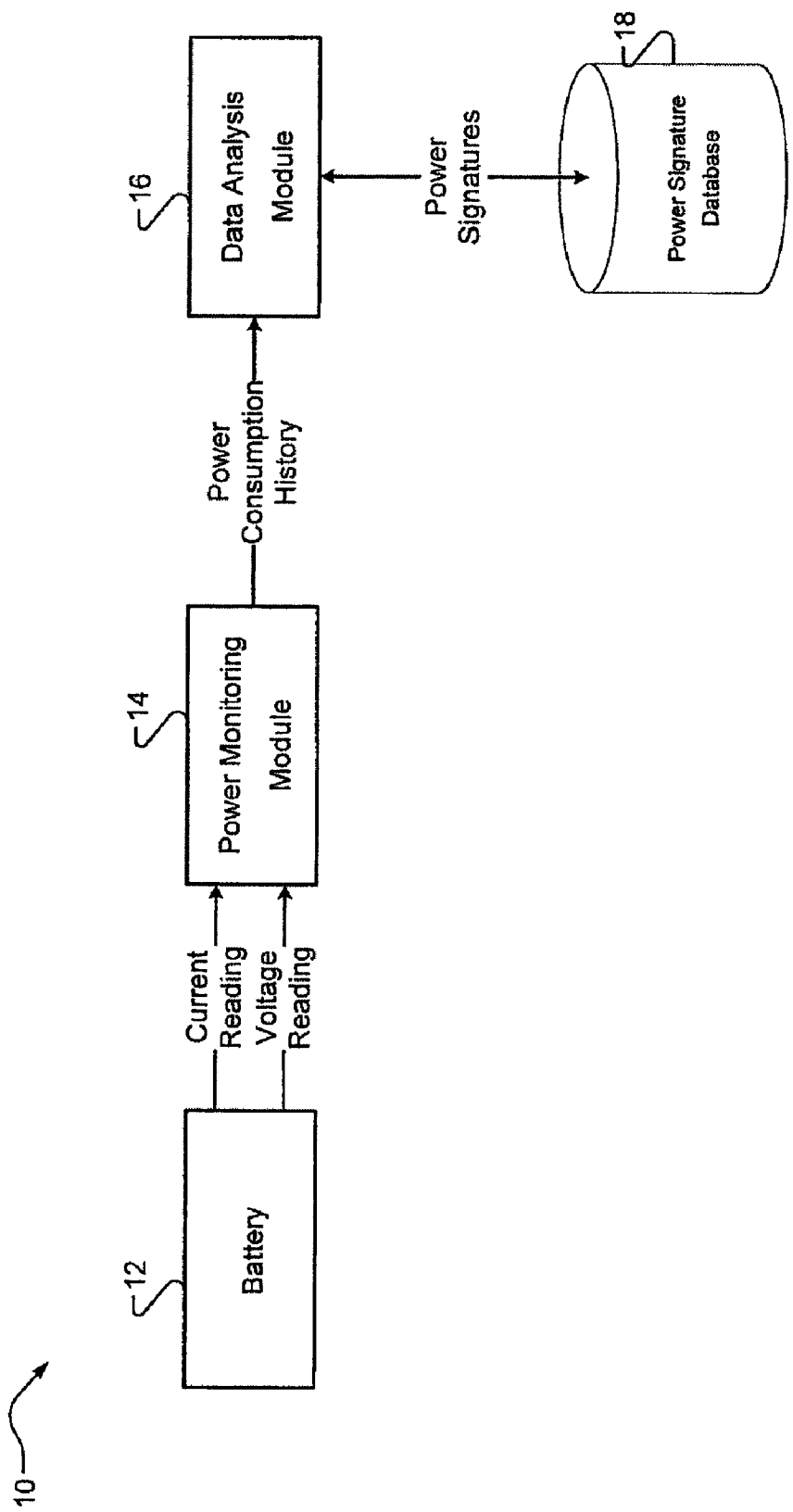
FIG. 1 is a diagram depicting an exemplary system for detecting malware applications residing on a mobile device.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 illustrates an exemplary system 10 for detecting malware applications residing on a mobile device powered by a battery. A power monitoring module 14 measure power drawn from the battery 12 of a mobile device. A data analysis module 16 receives the power measures from the power monitor and compiles a history of power consumption from the power measures received from the power monitor module and extracts a signature therefrom. The data analysis module then compares the power history signature with a plurality of known power signatures stored in a database 18 and initiates a protective operation if the power history signature is closely correlated to one or more of the known power signatures, where each of the known power signature signifies a power consumption anomaly. Each of these system components are further described below. While the following description is provided in the context of a mobile device, it is readily understood that the detection scheme is extendable to other types of computing devices.

Figure 3:
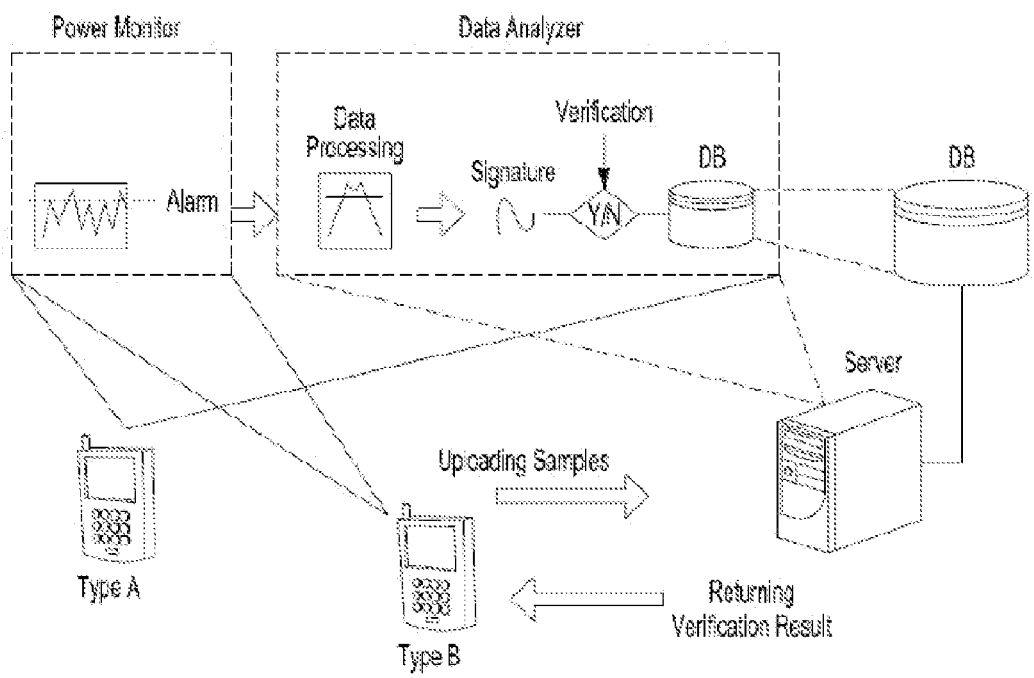
FIG. 3 is a diagram illustrating two exemplary configurations for the malware detection system.

FIG. 3 depicts two possible configurations of malware detection system 10. In Type A, the malware detection process is processed on the mobile device exclusively. In this configuration, the data analysis module 16 accesses a local copy of the power signature database 18. In Type B, the malware detection process is distributed between the mobile device, which runs the power monitoring module 14, and a server, which runs the data analysis module 16. In the Type B configuration, the power consumption histories, or power samples are transmitted to the server and a verification result is returned from the server to the mobile device. In either case, the server may maintain a master copy of the power signature database 18. Other configurations are contemplated by this disclosure. For example, the data processing may be handled by the device and the verification by the server, or the matching may be handled on the device, and the data processing on the server.

Figure 4:
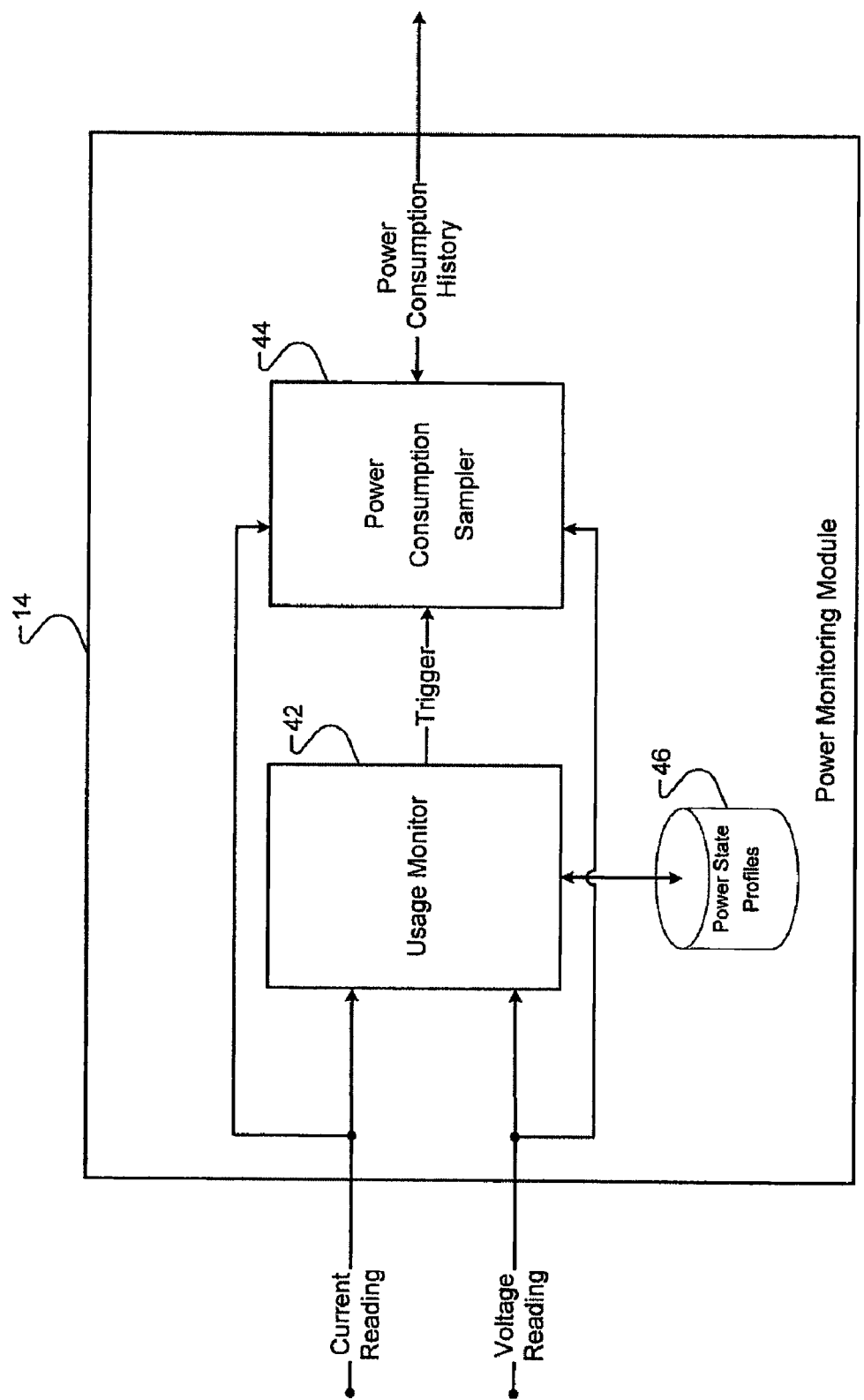
FIG. 4 is a diagram illustrating an exemplary architecture of the power monitoring module.

With reference to FIG. 4, the power monitor module 14 is designed to capture power consumption anomalies exhibited by applications residing on the mobile device. In an exemplary embodiment, a power monitoring module 14 collects power samples representing power drawn from the battery and begins monitoring the power usage when the amount of power draw exceeds the expected power usage. More specifically, the power monitoring module 14 may include a usage monitor 42, a power consumption sampler 44, and a power state profile database 46. The power monitoring module 14 receives a current reading and a voltage reading and determines an amount of power being supplied by the battery 12. Once the usage monitor 42 determines that the amount of energy output by the battery 12 exceeds a predetermined threshold, usage monitor 42 triggers the power consumption sampler 44 to begin sampling the energy consumption. The power consumption sampler 44 samples the current and voltage readings at various times and generates a power consumption history, which is communicated to data analysis module 16.

Different techniques for measuring power consumption are described below. In general, the energy usage of the device (or an application executing on the device) can be calculated by integrating the product of instantaneous current and voltage over a specific period of time. The energy usage can be approximated by sampling current, It, and voltage, Vt, at a constant interval, $\Delta t$. On many devices, this can be accomplished in software by polling the battery status. For example, on Windows-based devices, one can use the GetSystemPowerStatusEx2( ) function in Coredll.lib to retrieve complete battery status information, including AC line status, It, and Vt. As Vt will typically remain constant over the relatively short time intervals in which we are interested, a single measured battery voltage sample, Vc, is used to estimate the total energy consumption over n samples as $V_c \_ I_t \Delta t$. This approach, however, is limited by the accuracy and update rate of the reported battery status (over which we have no control), and the frequency of sampling.

Alternatively, energy usage can be measured by a hardware component, such as a Hall-effect probe. A hall-effect probe may be used to determine the current drawn by the handheld device. The hall probe detects the magnetic field generated by a current-carrying wire, resulting in a time-varying voltage, $V_i$, proportional to the current. Therefore, the total energy usage over n samples is calculated as $V_c \Sigma V_i \Delta t$.

Figure 5:
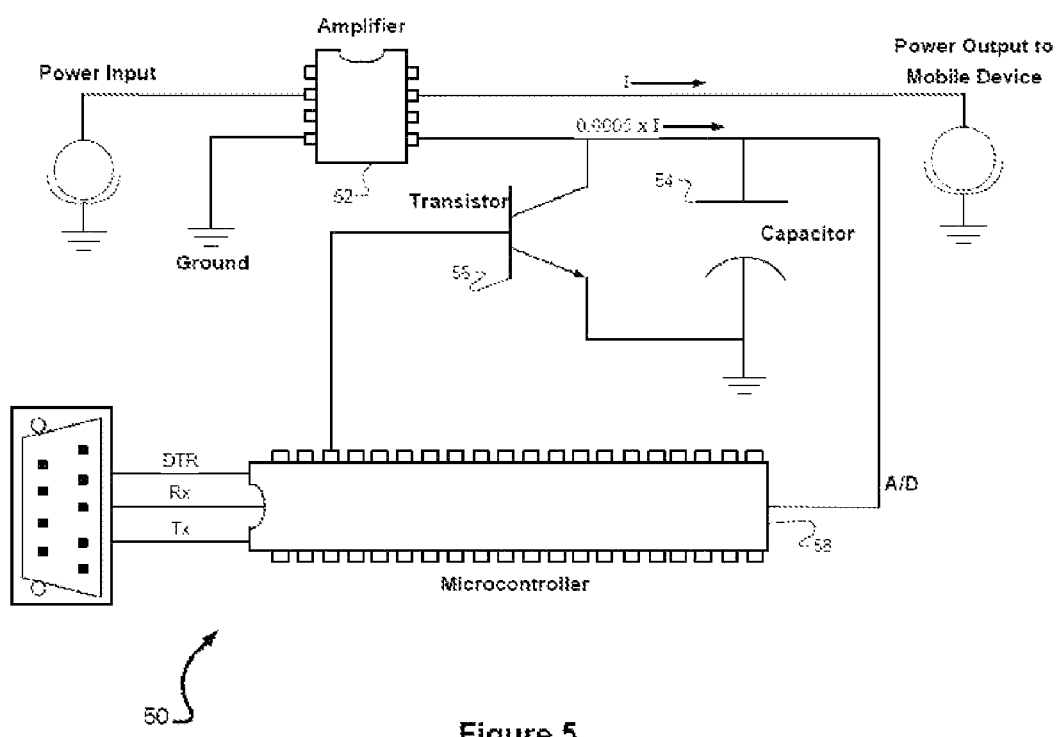
FIG. 5 is a diagram illustrating an exemplary hardware arrangement for measuring power consumption.

FIG. 5 illustrates another hardware arrangement for measuring energy usage in a device. In this arrangement, the charge-flow measurement sub-system 50 measures the total charge flow in conjunction with a software tool that continuously updates applications' energy consumption profiles. The measurement sub-system 50 can accurately measure energy consumption without requiring high sampling rates or costly equipment. The measurement sub-system 50 is design around a low-cost integrated circuit that essentially implements a current sensor (e.g., the Maxim MAX4071 chip). When connected between the power supply (i.e., the battery) and the load of the device, this sensing chip 52 produces a small current on an output pin that is proportional to the current drawn by the device. Due to the fast response time (e.g., less than 1 μs) of this chip, even high frequency changes in power draw are reflected in the output. This output leads to a resistive load; since V=IR, by measuring the voltage across the resistor and scaling by the right constant, one could determine the instantaneous current draw, It, of the mobile device.

Instead of sending the output current through a resistor, the sensing chip 52 charges a capacitor 54 that acts as an analog integrator. Reading the current directly requires a high sampling rate for accurate measurement of the fluctuating values which is expensive in terms of equipment and power requirements given a processing budget. The capacitor solution automatically sums up all of the fluctuating current values over time. Since Vcap=Ccap∫Io dt, where Io is the output current of the sensing chip and Ccap is the value of the capacitor, measuring the voltage on the capacitor lets us compute the energy drawn over a time interval as KVcVcap, where Vc is the supply voltage, and K the calibration constant. The constant K depends on the size of the capacitor and the exact ratio between the output current from the sensing chip and It (nominally, this is 1:2000). A transistor 55 is used to discharge the capacitor before taking a new measurement. The measurement sub-system 50 is calibrated by employing a fixed resistive load and comparing the measurements with those taken by a multimeter to determine the value of K. The K constant, therefore, converts voltage to the energy consumed by the mobile device.

Since all of the high-frequency changes in current are accounted for in the capacitor voltage, we can obtain accurate measurements of energy consumption with very infrequent sampling of the capacitor voltage. Thus, we do not need expensive equipment or high-speed data sampling. Rather, for data acquisition and energy computations, a 8-bit system-on-chip type microcontroller 58 (e.g., Atmel AVR series microcontroller) that includes internal clock generators, flash/RAM/EEPROM memories, multichannel 10-bit analog to digital (A/D) converters with internal reference voltage, and serial ports in a single IC. One A/D channel is used to measure the capacitor voltage, and another to measure the supply voltage. A digital output is used to control the transistor that discharges the capacitor between measurements. The serial port serves two purposes: the data lines are used to output the measured values to the measurement software, while the additional signaling (e.g., DTR) pins are used as a high-speed trigger to synchronize measurements with task execution on the target platform. The internal memories are used to store the calibration constant, and to store or aggregate multiple measurements.

In the context of the detection system, the power monitoring module 14 interfaces with the microcontroller 58 to obtain the measurement values. In one exemplary embodiment, the battery information is collected on a per-process level by modifying the scheduler in an OS kernel. The idea is to query the battery driver or the charge flow meter at the time of a context switch because this is the point in time at which one process will suspend execution and another will begin. The following paragraph discusses modifications made to the scheduler.

Per-process information is kept in the "task_struct" struct defined in include/linux/sched.h. Since both power and energy consumption are of interest, this struct is updated to include fields for the following: the last power measurement, how long the process's last timeslice was—the runtime, and a running total of the energy consumed (calculated as a sum of the products of power and runtime). The new fields in the struct are named "last_power", "last_runtime", and "total_energy" respectively. To query the battery driver at a context switch, the main scheduling function, schedule( ) is located in kernel/sched.c. In this fuction, the context switch occurs and information about the previous and next process is available. The measurement procedure within schedule( ) is in the following. Right before the call to context_switch( ) calls to sched_info_switch( ) and sched_info_depart( ) (located in kernel/sched_stats.h) are made, and the last function is where the process's runtime is calculated. After this, the htc_bat_t_retrieve_power( ) function from the driver (for SW measurement) or the current flow meter (for HW measurement) is called to retrieve the most recent power measurement. This is recorded in the last_power field of the task_struct and is also used to update the total energy consumption given the runtime calculated previously. Other implementations for interfacing with the microcontroller of the measurement sub-system are also envision by this disclosure.

To monitor power consumption, both the usage monitor 42 and the power consumption sampler 44 have to measure the current and voltage generated by the battery. In some embodiments, this reading may be constant. This approach, however, may result in an excessive amount of computational resources being allocated to the malware detection system 10.

Choosing an appropriate rate to measure the power consumption is a basis for detecting power-consumption anomalies. The higher the frequency of making a reading (a set of power measurement samples), the greater the chance of capturing power-consumption anomalies. The higher frequency, however, may have a detrimental effect on the energy usage. At the same time, mobile malware writers eventually learn about the implementation of power monitoring systems, which allows said writers to write malware that may evade detection. To avoid detection, the malware may remain dormant over a period of time and then occasionally reactivate itself. By cycling between dormancy and activation, malware behavior can be obfuscated. One way to prevent this obfuscation is to randomly choose when to take the next power reading. If the power-reading time is unpredictable, then it will be difficult for the malware to evade detection. If reading-points are too random, however, the ability to capture power-consumption anomalies may suffer.

Figure 6A:
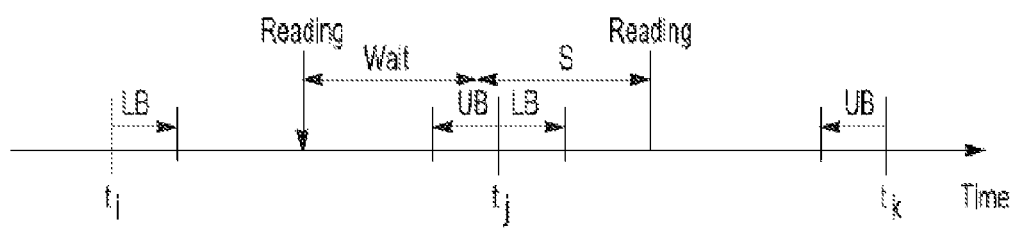
FIGS. 6A and 6B are diagrams illustrating exemplary power reading methods at regular and irregular intervals, respectively.

To placate the predictability/reliability tradeoff, two reading methods may be utilized: regular readings and irregular readings. The regular reading, as illustrated in FIG. 6A, occurs at fixed intervals at which lower bound (LB) and upper bound (UB) are defined, and a reading-point is randomly chosen in between them. In other words, LB and UB specify an interval in which to make a random choice of a reading-point. In each interval, after a reading, the power monitor waits for the next base and then randomly chooses the next reading-point. Clearly, the larger the values of LB and UB, the narrower the random-choice space, and thus, the more regular the reading frequency over time. In other words, reading-points are likely uniformly-distributed.

Figure 6B:
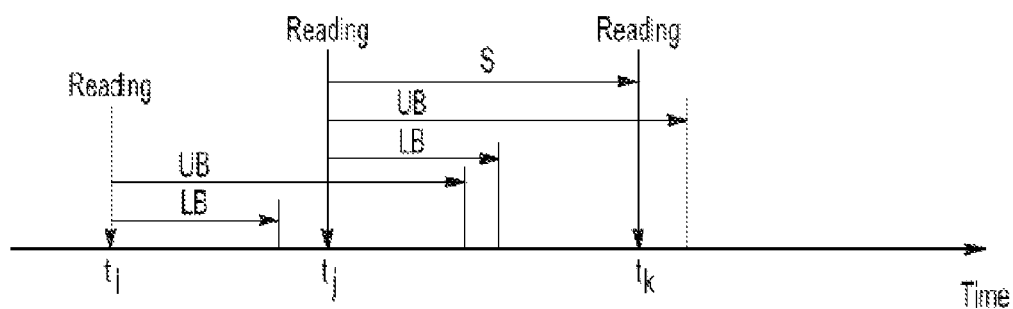

The irregular reading, on the other hand, does not wait to calculate the next reading-point, as illustrated in FIG. 6B. Instead, LB and UB are determined according to the previous reading-point and the next reading-point is randomly chosen in between. So, only LB and UB are used to adjust the random-choice space (i.e., UB minus LB).

The power monitor may create a timer object which is used as an alarm clock. When an alarm is triggered, the power monitor calls a system specific function, for example only, GetSystemPowerStatusEx2( ) in the Windows CE.Net library, to retrieve the battery status. This function may take a certain amount of time to complete, beginning with the invocation of its call to retrieve the data. This time period serves as a base for specifying LB and UB for the two reading methods. In practice, the time period amounts to more than 30 milliseconds, limiting the sampling rate. The regular reading invokes the timer object once more over a given time period to randomly choose the next reading time, incurring extra overhead.

The regular reading method is better suited for periodic reading and the irregular reading is better suited for random reading. The latter, however, can represent the same distribution of reading occurrences as the former when LB and random-choice space for the irregular reading are set to LB plus UB and 1.5 times that for the regular reading, respectively.

Figure 2:
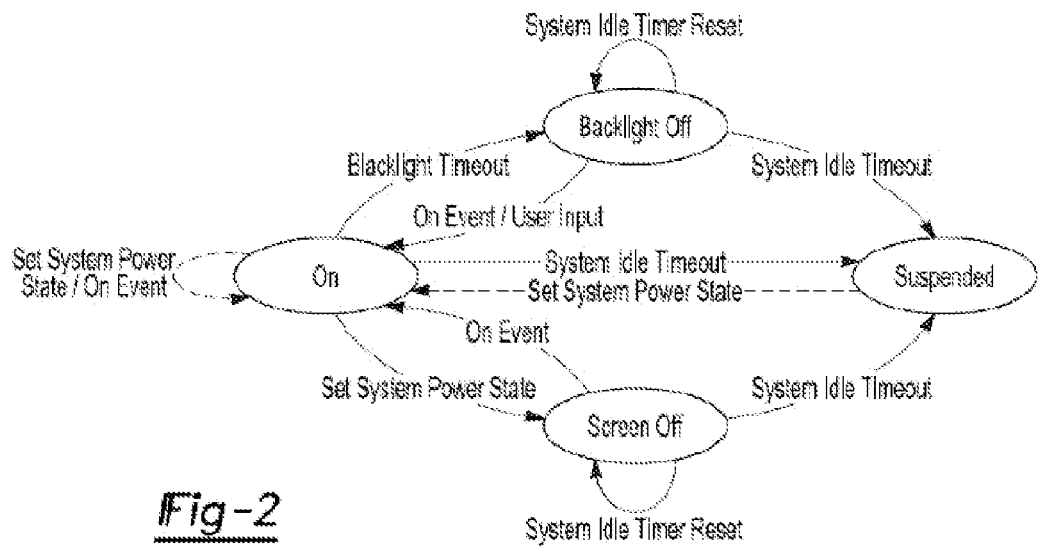
FIG. 2 is a diagram illustrating exemplary power states and transitions therefrom.

System power states may be used in the detection scheme as further described below. For background purposes, an exemplary system power state transition diagram is illustrated in FIG. 2. The system-power states are managed by a power manager in the operating system of the device. Each state is briefly described as follows. In the "ON" state, everything is ready for execution. The opposite is true in "Suspended" state. In the "BacklightOff" state, everything except for the backlight is ready to use. The transition from "ON" to "BacklightOff" is made with the backlight timer enabled, allowing energy savings of 2.90 Joules for 10 seconds. In the "ScreenOff" state, the LCD screen is off. The transition from "ON" to "ScreenOff" is typically made when an application makes a request to the power manager, such as Windows Media Player via SetSystemPowerState( ) which then allows the user to listen to the device in the "ScreenOff" state. In the "Suspended" state, most programs are deactivated, while only a few device drivers are awake. The transition from "ON"/"BacklightOff"/"ScreenOff" to the "Suspended" state is made when the SystemIdle timer expires. SystemIdleTimerReset( ) then initiates the timer. Besides these system-power states, "UserIdle," "Unattended," and "Resuming" states are available only for specific models of SmartPhones or PocketPCs (which are not considered in this paper). Given different charge levels, information on energy usage and average power-consumption level in each state can be recorded by power monitoring module.

The usage monitor 42 triggers power consumption sampler 44 to monitor the energy usage once the power ratio, or alternatively power usage, exceeds a predetermined threshold. Usage monitor 42 detects a surge in the power consumption, calculating the fraction of power surplus as follows:

$$\left(\frac{X}{Y} - 1\right) > \delta, \quad (1)$$

where δ is a given threshold, X is an observed power level, and Y is the trained power level specified in the system-power state profiles 46. The system-power state profiles 46 define the average power-consumption level in each system-power state (e.g., "ON", "BacklightOff", and "ScreenOff"). If the fraction exceeds the threshold, the usage monitor 42 then raises a flag, directing power consumption sampler 44 to immediately start yielding a power consumption history.

It is noted that erratic spikes may be observed during the power reading process due to the switching properties of the digital system, resulting in false alarms. To reduce these false alarms, the threshold may be set high enough to be resistant to those spikes. It follows, however, that the higher the threshold, the fewer the false alarms, but the less sensitivity to the surge in the power consumption. In addition to the threshold adjustment, a false-alarm counter may be used. Each time a false alarm occurs over an alarm-time period starting from the first alarm occurrence, the false-alarm counter is incremented by one. When the counter is greater than a given alarm-threshold, a true alarm is raised, leading to a switch to a sampling step. The false-alarm counter is set to 0 when the alarm-time period expires or a true alarm occurs. Preliminary testing has shown that when δ=0.2, no false alarms occur in the "ON" state in which no explicit applications run. When δ<0.2, peaks from the spikes are detected, resulting in false alarms. Given a peak interval, either the alarm-time period (e.g., an estimated 4 reading intervals) or the alarm-threshold is adjusted to avoid these false alarms.

In the exemplary embodiment, the power consumption sampler 44 reads the current and voltage readings from the battery 12 and generates a power consumption history once triggered by the usage monitor. The power consumption sampler 44 starts taking samples of the power consumption at a constant rate, thereby generating a power consumption history. It is noted that, the higher the sampling rate, the more accurately the power consumption history can be interpreted, but also the greater the energy cost. In addition, the timer object that the power monitor sets off at every given time interval can be preempted by another higher priority process, resulting in a measurement delay, i.e. completion time minus set-off time. Nevertheless, this delay can be offset by lengthening the sampling time period. In practice, the size of the history that results from software measurements of the power consumption can also be used to differentiate applications, thus eventually being added to the corresponding power signature.

It is noted that the power consumption history is comprised of a large amount of samples. Each sample represents the instantaneous power at a specific time. Thus, each power consumption history may be made up of 1000 or more samples, each sample indicating a power usage at a specific time. Additional information may also be included in a power consumption history, such as the application known to be running at a time t, the observed current, and the observed voltage. The applications known to be running may also be obtained directly by the data analysis module from the kernel of the operating system.

Figure 7:
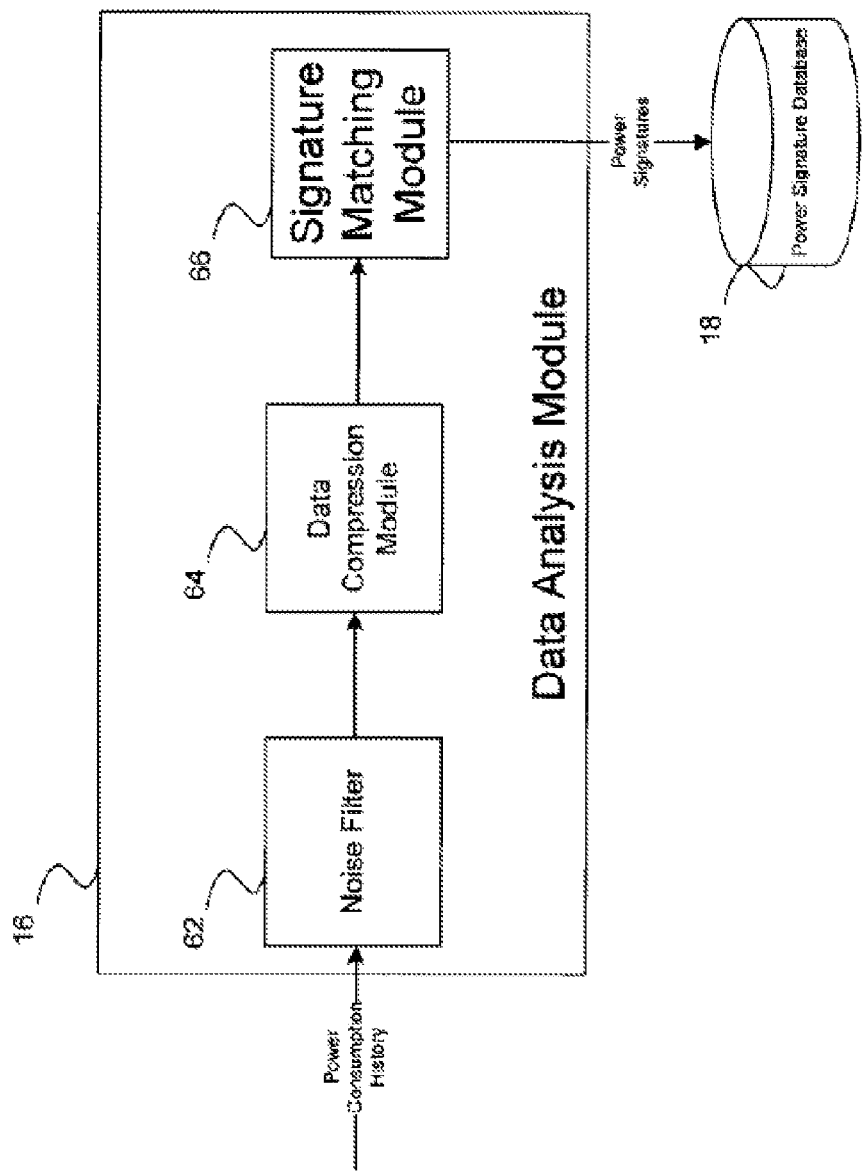
FIG. 7 is a diagram illustrating an exemplary architecture of the data analysis module.

With reference to FIG. 7, the data analysis module 16 receives the power consumption history from the power monitoring module 14 and is designed to extract a pattern from the history, yielding a power signature. In yielding the power signatures, an exemplary data analysis module 16 may use two data processing software components: noise-filter 62 and data compression module 64. Extracted power signatures are then compared by a signature matching module 66 against a database 18 of a priori signatures.

To reduce the effects of outliers on the power consumption history of an application, a noise filter may be applied to the dataset history received from the power monitor module. More specifically, a moving average filter removes high-frequency noise from the dataset, resulting in a more generic power-consumption pattern. While calculating the average of its neighboring samples within a window of size 2k+1, each sample, S(i), in the power consumption history is converted into another, $S_p(i)$, as follows:

$$S_p(i) = \frac{1}{2k+1}(S(i-k) + S(i-k+1) + \ldots + S(i+k)). \quad (2)$$

This calculation starts from i=k+1 and continues until i=n−k. The first and the last k samples may be dropped since the overall power consumption pattern is what is primarily of interest. The window size determines the smoothness of the curve, i.e., the larger the k the smoother the curve. The flip-side, however, is that a more smoothed curve may result in lesser characterization of very recent fluctuations in the dataset.

The noise filter 62 may be implemented in a number of ways. The foregoing described a simple moving average filter (e.g., a weighted moving average filter in which different weights are imposed on different distant samples or an exponential moving average filter in which weights decrease exponentially from the center). A simpler filter may be preferable because a simple filter may function just as well as complicated filters, but the implementation incurs less processing overhead. It is envisioned, however, that any type of filter may be used such as FIR filter (Finite duration Impulse Response filter).

The filtered (or unfiltered) power consumption histories may be compressed by data compression module 64 to generate a power signature. A large power consumption history, which will result in a large power signature, needs to be reduced for two reasons. First, a large power signature consumes more energy than a small one in executing the matching process. Second, it is important to make economical use of memory in a mobile device. In one embodiment, a simple and powerful one-way compression algorithm may be used. By applying the compression algorithm set forth below, local jitter is effectively suppressed and compressed. As a result, a compact power signature can be represented, thereby achieving a substantial savings in both memory space and processing time.

---

Algorithm 1 A compression algorithm

---

1: Input: $S_p(n)$: an n-length power consumption history
2: Input: m: look-ahead samples
3: Input: $\delta_c$: a threshold
4: Output: $S_e(k)$: a k-length power signature
5: while $i \leq (n - m)$ do
6:    Fetch m samples from $S_p(i)$;
7:    Compute $N \sim (\mu, \sigma^2)$ of m;
8:    if $\sigma < \delta_c$ then
9:      $S_e(j) \leftarrow \mu$ ; /*compressing history*/
10:      $j \leftarrow j + 1$
11:    else
12:      $S_p(i:i+m) \leftarrow S_e(j:j+m)$; /*copying history*/
13:      $j \leftarrow j + m$
14:    end if
15:    $i \leftarrow i + m$
16: end while

---

In this algorithm, a power consumption history of length n is taken as input. The algorithm breaks down the power consumption history into a plurality of chunks or segments. At each iteration, the standard deviation and variance of m samples is calculated. If the variance is less than a predetermined threshold, those m samples are set to the mean of the m samples, else the m samples are kept as their original values. It is appreciated that other data compression algorithms may be used to compress the data, such as Huffman coding, arithmetic coding, algorithm FGK, algorithm V, algorithm BSTW, Lempel-Ziv coding, or LZW data compression.

The power signature is used for comparison with known power signatures for purposes of identifying power consumption anomalies on the device. In the exemplary embodiment, the data compression module 64 passes the power signature, i.e. the filtered, compressed power consumption history, to the signature matching module 66. The signature matching module 66 in turn computes a similarity measure between the power signature and the power signatures stored in the database 18.

In an exemplary embodiment, a chi-square ($\chi^2$) distance may be used as the similarity measure. The $x^2$-distance is calculated as:

$$x^2(S_e, S'_e) = \sum_{i=1}^{n} \frac{(S_{ei} - S'_{ei})^2}{(S_{ei} + S'_{ei})}, \quad (3)$$

where $S_e$ and $S'_e$ are signatures of the observed and the expected events, respectively. Clearly, $x^2=0$ if and only if all of the samples of $S_e$ match those of $S'_e$. The higher the value of $x^2$, the less likely the observed event belongs to the expected group. Thus, the $x^2$-distance is an effective and efficient means for comparing the power signatures. Experimental results show that the use of the $x^2$-distance reduces the amount of computation over one of the more widely used techniques, i.e., the Bhattacharyya distance. This is not to say that the Bhattacharyya distance could not be used, and is contemplated in alternative embodiments. Likewise, other types of similarity measures also fall within the scope of this disclosure.

Two power signatures that have the most similar power consumption patterns are found as:

$$x^2(S_e, DB) = \min_{S'_e \in DB} \{x^2(S_e, S'_e)\}. \quad (4)$$

In some cases, two power signatures that comply with the same pattern can be skewed mainly because of delays in capturing the power surge. Since the $x^2$-distance is based on the measurement of sample-to-sample distance, in order to effectively match two skewed power signatures, the signature matching module 56 may rely on a number of matching techniques, including brute-force (BF) comparison and Fast Fourier Transform (FFT). The brute-force approach uses two parameters: an incremental state and a threshold. First, the distance is calculated and then one of the two power signatures is shifted left by one (and is subsequently done to the right). At the same time, if the newly-calculated distance is greater than, or equal to the previous distance, the incremental state parameter increases by one; otherwise, it is set to 0. This procedure repeats until the incremental parameter exceeds the threshold. When this procedure stops, it returns the minimum distance. In addition to the incremental parameter, the proportion of samples for comparison correlates with the confidence in the comparison results (e.g., more than 90%). The brute-force comparison is especially efficient in the case of small delays in the reading of the power monitor.

Alternatively, the FFT method may be applied, converting time-domain representation of samples into their frequency-domain representation. In practice, this method facilitates the calculation of the distances in that a large portion of converted samples in two signatures that are similar to each other are likely to have the same constant frequency components, which offsets the complexity of the FFT computation.

In an exemplary embodiment, a power signature signifies any power consumption that occurs on the device. In other words, the power signature is an accumulation of power consumption for all applications running of the device. The database 18 may in turn store power signatures that signify a power consumption anomaly, such as caused by a malware application. By comparing the observed power signature with each of the known power signatures stored in the database, the signature matching module 66 can determine the existence of an anomaly and initiate a protective operation if the observed power signature is closely correlated to one or more of the power signatures. More specifically, the signature matching module computes a similarity measure and triggers the protective operation when the similarity measure exceeds a predetermined threshold. Other techniques for correlating observed power measures to known power consumption patterns also fall within broader aspects of this disclosure.

In an alternative embodiment, the known power signatures may be associated with a particular application or combination of applications. In this arrangement, the known power signature and associated power signature(s) can be labeled as being either legitimate or malicious. When comparing the observed power signature, the signature matching module 66 may elect to subtract the power signature for legitimate applications known to be running on the device from the observed power signature. In this way, the signature matching module 56 can derive an observed power signature for an unknown source. The signature matching module can then compare the derived power signature to known power signatures in the manner described above.

Exemplary protective operations include generating an alarm, terminating and/or quarantining a suspected application. In one embodiment, the signature matching module sends an alert to the operating system which can in turn initiate a protective action. The protective operation may further include labeling the observed power signature as 'malicious' and updating the database accordingly. Other types of protective operations are also contemplated by this disclosure.

Implementation and evaluation of an exemplary malware detection system is further described below. For demonstration purposes, two type of programs were written. The first program aims to deplete the battery power on an HP iPAQ rx4200 running the Windows Mobile 5 OS, and the second program emulates the behavior of four mobile worms on the same handheld device. Further details on how the signature database is built and how software and hardware measurements are made in the exemplary system are also provided.

One of the most energy-consuming activities on a handheld device is the use of the WiFi radio. A handheld device with WiFi turned-on consumes 2.5 times more energy than when WiFi is turned-off (corresponding to the ON state in the figure) and 1.8 times more energy when Bluetooth is turned-on. Thus, for exemplary purposes, a malware program called WiFI faker is presented. WiFI faker launches a battery-depletion attack using the WiFi radio. When the WiFi faker is executed on the handheld with the WiFi-enabled mobile device, it falsely signifies to the system that the WiFi device has been disabled. By rendering the WiFi adapter invisible to the system, the user sees the WiFi-associated system tray icon indicating the WiFi device is inactive, but in reality it is still active and even deprived of doze mode, resulting in retaining the highest power consumption level. This deception is realized using two power management functions, DevicePowerNotify( ) and SetDevicePower( ) In addition, the WiFi faker can collaborate with a dummy program which launches CPU-intensive activity (e.g., evaluating an exponential function), causing the battery to drain rapidly while the user believes that the WiFi radio is disabled.

Figure 8:
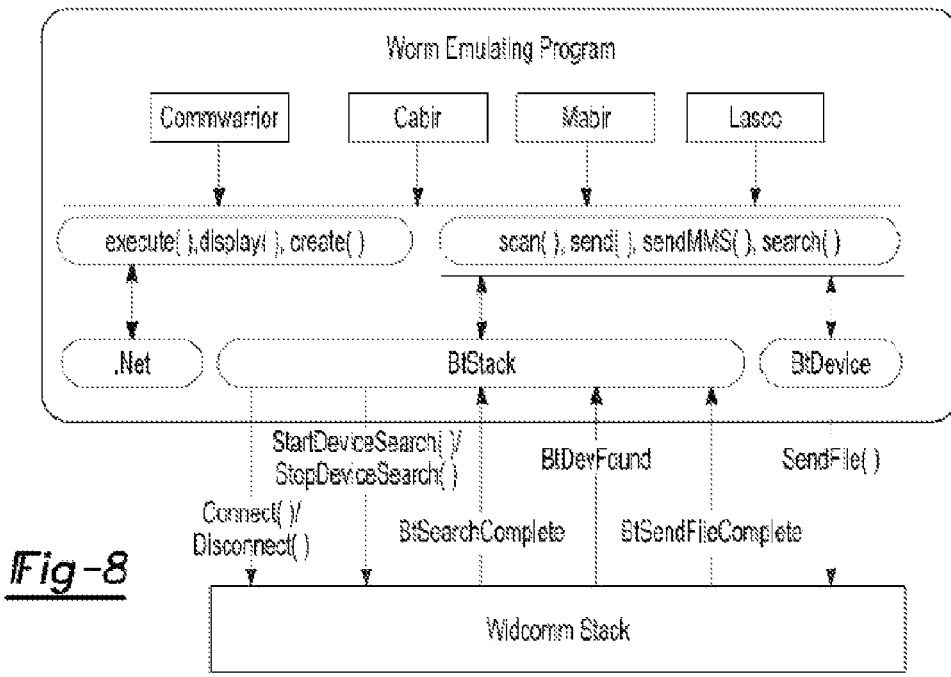
FIG. 8 is a diagram illustrating an exemplary architecture of a worm emulator.

Scanning for Bluetooth-enabled devices and transmitting a file (regarded as worm payload) via Bluetooth are part of the fundamental capability of many of known mobile worms. The program that accesses a Bluetooth module in a device is implemented using the BTAccess.NET v3.0 library which supports the Widcomm Bluetooth stack for our handheld device. Two main classes from the library are used: BtStack and BtDevice, as illustrated in FIG. 8. Before using the Bluetooth radio, the program connects to the Widcomm stack, using Connect( ) in the BtStack class (while Disconnect( ) is used for disconnection from the stack). Once a connection is made, Bluetooth-enabled devices nearby are searched for using StartDeviceSearch( ) which functions asynchronously. To stop the scan before completion, StopDeviceSearch( ) is called.

An event handler monitors two events: BtDeviceFound and BtSearchComplete. The event handler captures the BtDeviceFound event, thus returning the corresponding BtDevice object. This object is then added to a list for later retrieval. When the event handler captures the BtSearchComplete event indicating the completion of the search, the program stops searching for devices. In order to send a file (i.e., worm payload) when the searching is finished a BtDevice object is dequeued from the list and SendFile( ) in the BtDevice object is called. Success in sending a file triggers the BtSendFileComplete event. This procedure continues until all the objects on the list are dequeued.

The overall behavior of the four worms is represented by combinations of seven component actions, as listed below:

($s_1$) execute( ): starts a worm-behavior emulation.

($s_2$) display( ): opens a window and displays a message on the window. Cabir and Lasco exhibit this behavior to identify themselves.

($s_3$) create( ): generates a 15 Kbyte array of data (i.e., another worm payload). The data are then stored in a system directory. An instance of the FileStream class is created in order to write to a flash memory.

($s_4$) scan( ): searches for Bluetooth-enabled devices nearby, using the service discovery application profile defined in the Widcomm Bluetooth stack. This profile relies on Service Discovery Protocol to discover devices.

($s_5$) send( ): sends a file (i.e., worm payload) to the devices found during the scan. This function uses the generic object exchange profile defined for the Widcomm Bluetooth stack. The OBEX protocol in the profile is used to push the file data to nearby mobile devices.

($s_6$) sendMMS( ): searches an address book and executes send( ). This behavior imitates an MMS message transmission except that the Bluetooth radio rather than an EDGE network is used.

($s_7$) search( ): searches the system directory for specific system files having a specific extension (e.g., Windows CE installation cabinet (.cab)) so that they are virtually appended for infection. The search is recursively performed from the root through its subdirectories. DirectoryInfo.GetFiles( ) is applied to retrieve all the files in a given directory, and DirectoryInfo.GetDirectories( ) is applied to retrieve subdirectories for the recursive call.

Note that the time taken to complete scan( ) and send( ) varies, depending on the variety of Bluetooth-enabled devices found nearby, and the number of corresponding objects on the list. The more objects found in the scan process, the longer the completion of the send( ) takes. The effect of this unforeseen situation results in a variety of signatures yielded even from the same application. Nevertheless, the detection framework effectively identifies such power signatures.

The action sequence for each worm is presented in Table 1 below, showing common subsequences.

TABLE I

| Worm Type | Sequential behavior |
| --- | --- |
| Cabir | $s_1s_2s_3s_4s_5$ |
| Mabir | $s_7s_3s_6s_4s_5$ |
| Commwarrior | $s_1s_3s_4s_5s_8$ |
| Lasco | $s_1s_2s_3s_4s_5s_7$ |

For instance, all the worms but Mabir have a common subsequence, $s_3s_5s_6$. However, their power signatures can be greatly different from each other because of the $s_5$ behavior. Similarly, Cabir and Mabir have behavior in common. Cabir is likely misidentified as Lasco.

For demonstration purposes, pairs of applications that have similar behavior and different intent, i.e. one legitimate and one malicious, are chosen. For instance, a program designed to execute CPU-intensive functions and a Windows Media Player (WMP) are both energy-greedy, but have different intent. Also, the mobile worms described above and legitimate Bluetooth file transfers have a common behavior, but have different intent.

First, the following malicious applications are characterized in order to build the power signature database. The dummy program executes a function that is not productive and just consumes CPU time (e.g., CPU-intensive computation), wasting energy. Power consumption histories are captured at the beginning and in the middle of this program run, thereby extracting two different power signatures.

The WiFi faker program, as described earlier, disguises the WiFi system tray icon to appear as inactive and in fact turns on the WiFi radio operating in the highest power mode all the time. This behavior is captured and then one power signature is extracted. The WiFi faker is executed and the dummy program is then launched (the order of execution does not matter). One energy signature is extracted while the two programs are running.

A DoS-attack-like Bomber program bombards the handheld with 1 Kbyte- and 2 Kbyte-size data via WiFi (eg, ping –s 1024/2048). In practice, a stream of 2 Kbyte-size data froze the handheld after 30 seconds. Two different power signatures are extracted for the different size packets.

Second, legitimate applications are also characterized as follows. The Windows Media Player program incurs high energy consumption, but the amount of energy consumption varies depending on the video codecs used, e.g., Windows Media Video (WMV) 9 at 315 bps and WMV7 at 704 bps. Power-consumption histories are recorded at the beginning and end of 5 seconds of execution for each codec, resulting in four different power signatures.

A 10 Mbyte-size file is transferred via Bluetooth and WiFi. Note that the Bluetooth file transfer and the four mobile worms, as well as the WiFi file transfer and the Bomber, have behavior in common, respectively. Two power signatures are extracted.

Two users separately explore files, i.e., tapping on the start menu and executing the file explorer. They then drag the scroll-bar up and down, tapping on a subfolder and opening an image file. This pattern leads to two different power signatures.

For software measurements, GetSystemPowerStatus Ex2( ) in Coredll.lib was used to retrieve battery status information, including AC line status, battery current, and battery voltage, which are normally used for monitoring the system. Hardware measurements were made with the Agilent Infiniium 54815-A oscilloscope which is capable of sampling at 1 GS/s with a 1 millisecond peak detection. This oscilloscope makes it easy to synchronize power measurements with process execution. Unless otherwise specified, samples are taken every 100 milliseconds from software measurements (execution) and every 10 milliseconds for hardware (power).

The energy-consumption history is recorded over 10 seconds via hardware measurement, and 20 seconds via software measurement. The first round of the execution of these application scenarios yields 18 different power signatures. Twenty rounds are made in total; the first 5 rounds result in 90 power signatures which are used as a training set, and the remainder yields 270 power signatures which are used as a test set.

The metrics used to indicate the detection accuracy include pinpoint accuracy (PA) and true-positives. PA represents the ability to classify an event correctly. For instance, Cabir should be identified as Cabir rather than any other type of malware, such as Mabir. As there will be no signatures in the database for previously unknown malware, the data analyzer is unable to identify it by name. Because signatures are classified as malicious or legitimate, however, the data analyzer is able to classify previously unknown applications as either malicious or legitimate. The success rate in this classification is represented by the true-positive rate. Thus, PA is a measure of true-positives. In addition, false-positive (classification of benign activity as malicious) and false-negative (failure to identify malware) rates are calculated.

First, we assess system parameters defined in the power-aware malware-detection system and then evaluate the detection accuracy with the optimal values of the system parameters found. Finally, the performance issues of the framework are analyzed.

Figure 9:
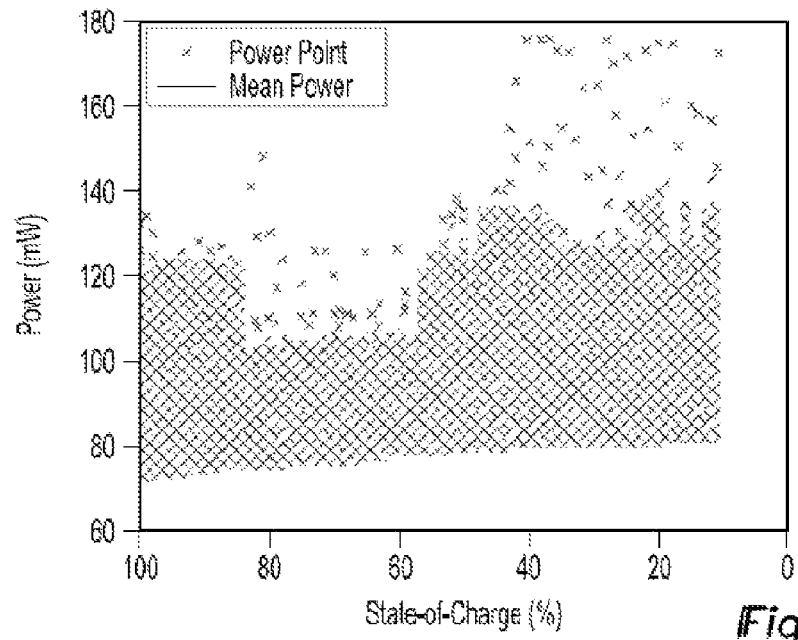
FIG. 9 is a graph depicting exemplary power consumption variations with respect to the battery charge level in software measurement.

To understand the correlation between state-of-charge levels and the variation of the power drawn from a lithium-ion battery (e.g., HP Model No. HSTNH-S11B with 1200 mAh), a power measurement program to run on the HP iPAQ rx4200 is implemented. After the battery is fully charged, the power-measurement program starts reading the on-device hardware power monitor once a second, logging the corresponding power-consumption values. The remaining charge in the battery decreases over time at a room temperature of 75 degree Fahrenheit/24 degree Celsius. The effect of inherent increase in battery temperature over time (it increased by 2 degree Fahrenheit) during the program run could not be excluded. FIG. 9 shows a battery power consumption distribution and the average power consumed as the battery discharges. Note that the characteristics of the battery discharge are also affected by the battery age. Clearly, the recognition system for overall average power consumption relies on the knowledge of the battery state-of-charge. For instance, when the state-of-charge level is between 84% and 100%, the average power consumed increases from 84 mW to 86 mW. When the state-of-charge level is between 56% and 83%, the average power steeply drops to 80 mW and gradually increases up to 82 mW. At a charge level of 55%, the average power jumps back to 90 mW and after this, it steadily increases over time. This pattern results from short, heavy current spikes from the handheld caused by the non-linear digital electronics as a result of its changing supply voltage. The changing supply voltage is caused by a voltage drop across the battery's increasing internal resistance that is associated with the battery-charge level. As a result, each power signature is extracted, according to the three different charge levels (high, med, and low). Battery temperature, on the other hand, was found to have no impact on the power consumption pattern except that the frequency of spike occurrences was reduced at very low temperatures (e.g., 35 degree Fahrenheit/2 degree Celsius).

Figure 10A:
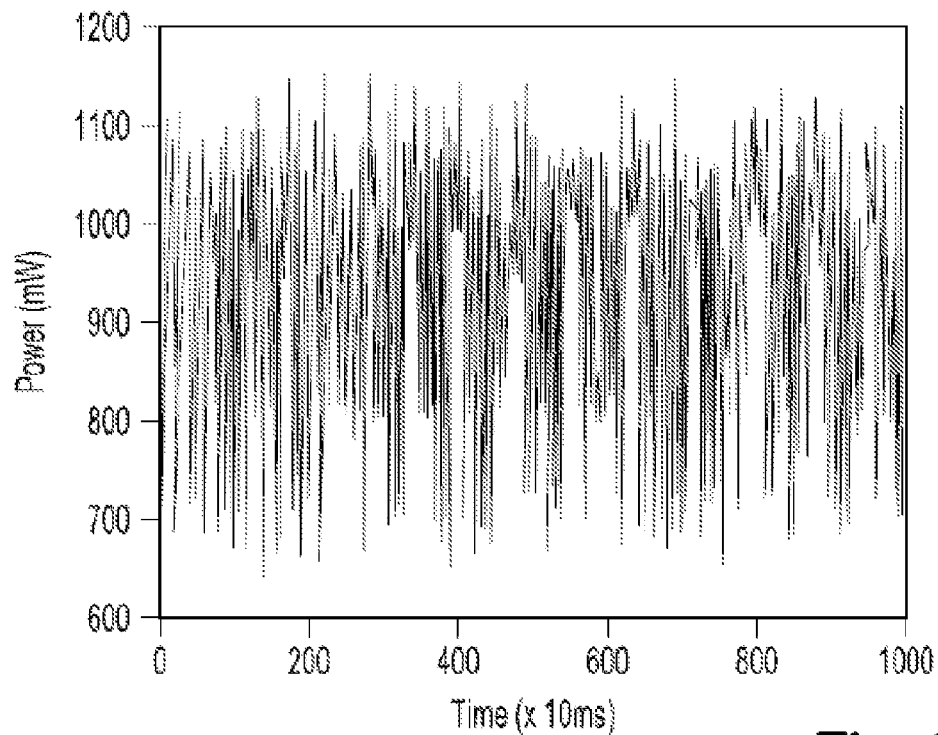
FIG. 10A-10C are graphs illustrating the generation of a power signature.
Figure 10B:
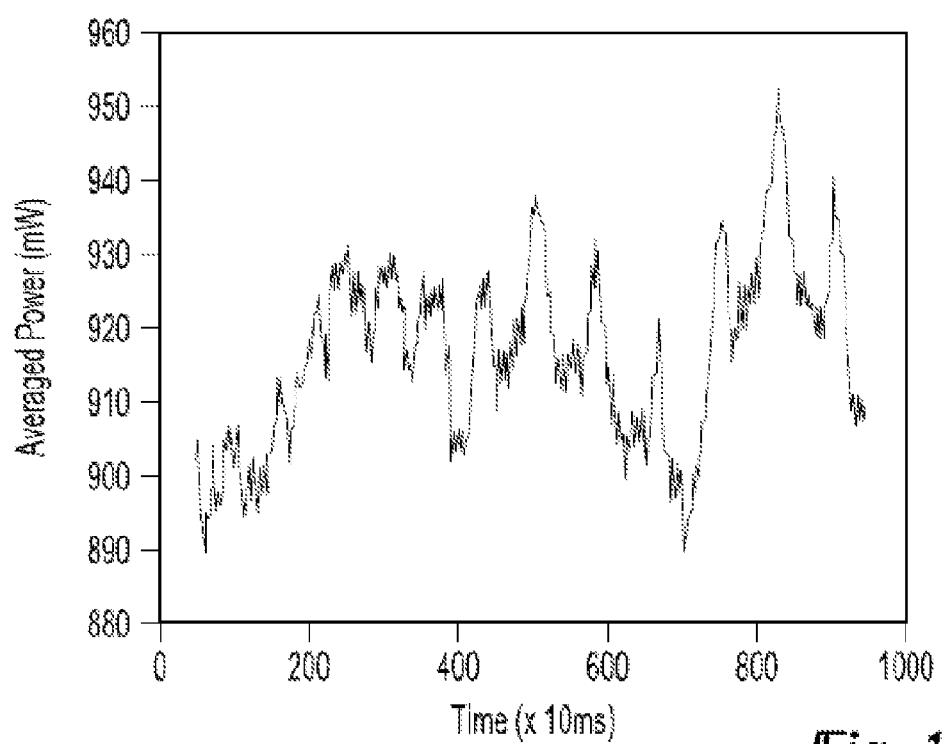
Figure 10C:
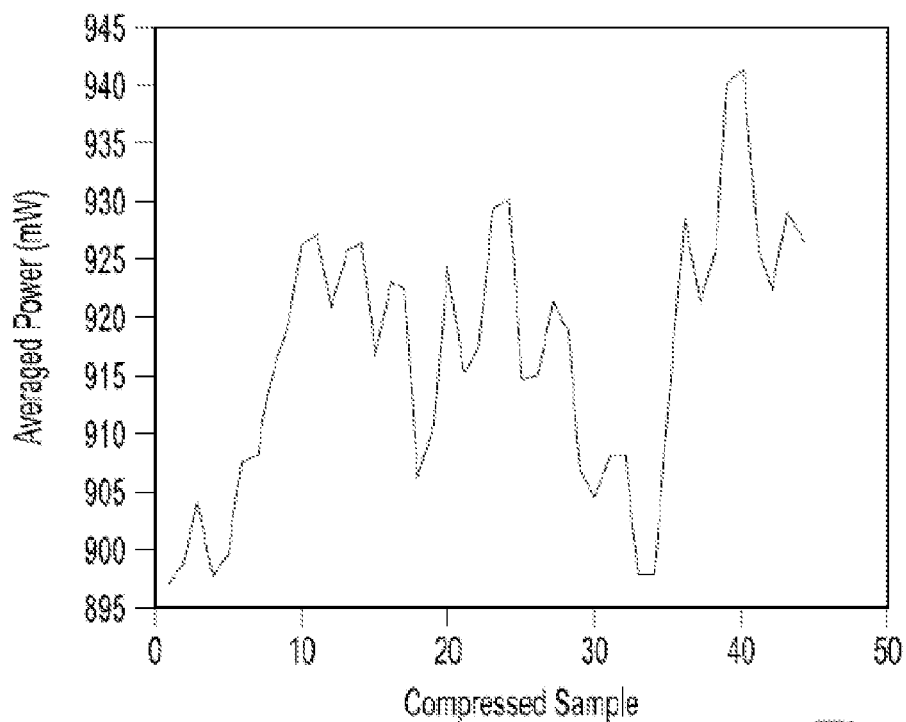

A power consumption history is produced while running an application on a handheld. The power consumption history may be transformed into a power signature via at least one of two techniques: the moving average filter and the data compression. The moving average filter removes noise from the power consumption history, effectively extracting a pattern. The compression technique, on the other hand, is applied to reduce the size of a signature, without losing the detection accuracy. In the compression technique, local jitter is suppressed and compressed. FIGS. 10A-10C show the procedure of generating a power signature from the power consumption history of a video clip playback with a bit-rate of 315 bps, using the WMV 9 codec. FIG. 10A shows the power consumption history captured in which a pattern can hardly be recognized, mainly because of signal noise. After the filter is applied, a pattern becomes visible as shown in FIG. 10B. The application of the compression technique results in a power signature as shown in FIG. 10C. It is noted, though, that a power signature may reflect the power history in some scenarios. In such scenarios, the power usage history may be unfiltered and/or uncompressed.

Figure 11:
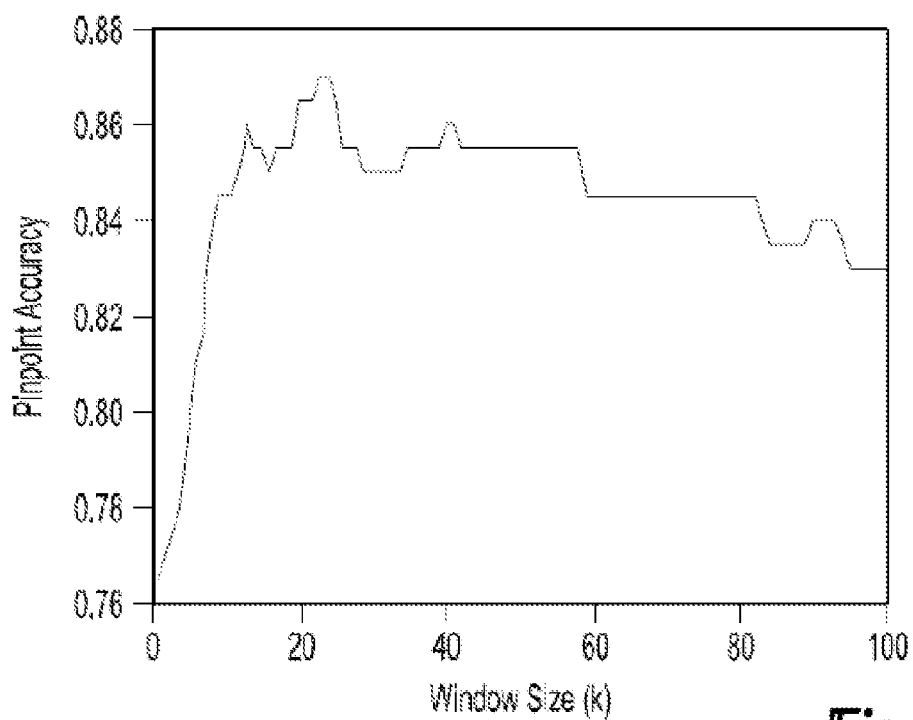
FIG. 11 is a graph showing correlation between the window size of a moving average filter and pinpoint accuracy.

The window size (k) in the moving average filter determines the degree to which noise is reduced, which, in turn, correlates with the detection accuracy. That is, the larger the k, the smoother the curve, which may lower the accuracy. On the other hand, if k is too small, the filter may be less effective for reducing noise. Thus, the optimal k needs to be found to achieve the highest accuracy. An experiment was conducted to find the optimal values, with the look-ahead size and its threshold fixed (m=5 and $\delta_c$=0.05 whose assessment will be presented shortly). The detection accuracy with a test set of 270 power signatures and a database of 90 power signatures labeled as either legitimate or malicious was evaluated. FIG. 11 shows the correlation between the window size and PA, the 23- or 24-point moving average filter for the 1000-sample power consumption history allows the highest PA. When k is smaller than 23, the filter is less effective and as k becomes larger after 24, the effectiveness of reducing noise is gradually degraded. The reason for this is that the large k reflects less of recent fluctuation of samples of the power consumption within the window.

Figure 12A:
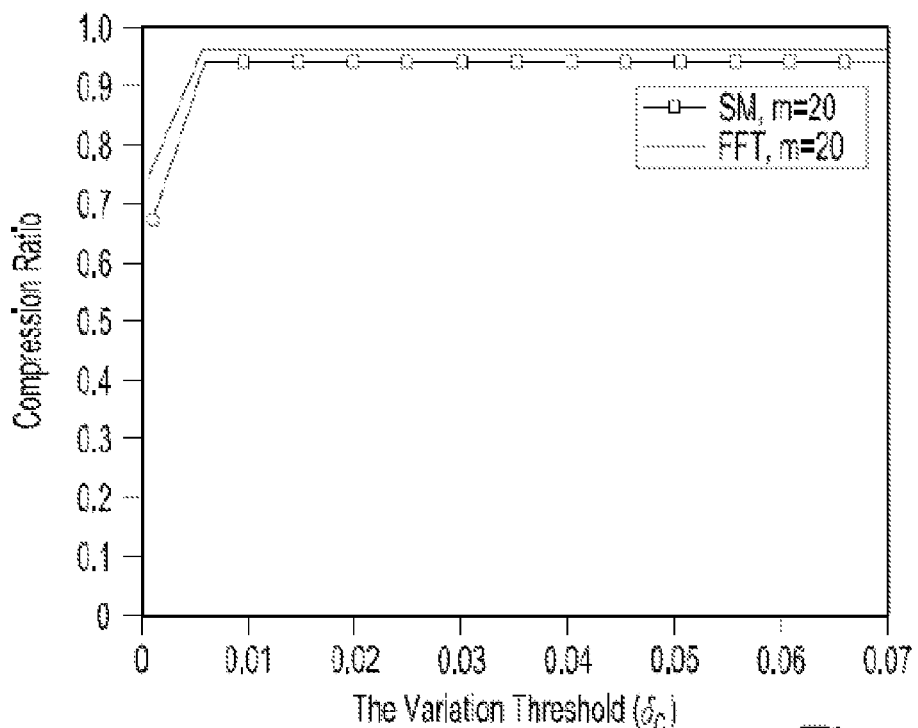
FIGS. 12A-12D are graphs that illustrate the effectiveness of compression in the data analysis process.
Figure 12B:
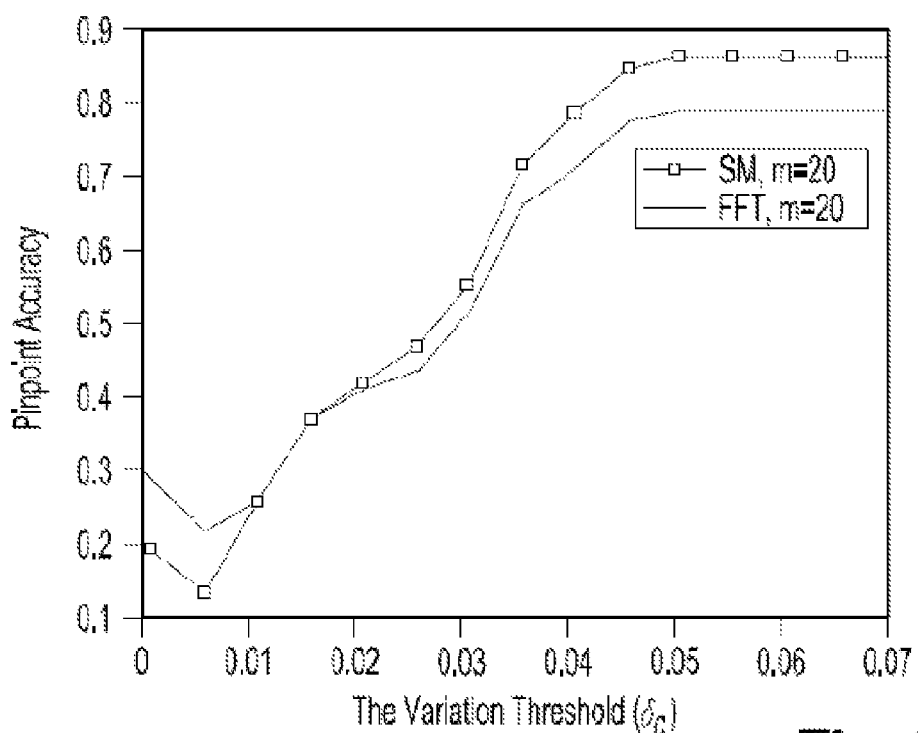
Figure 12C:
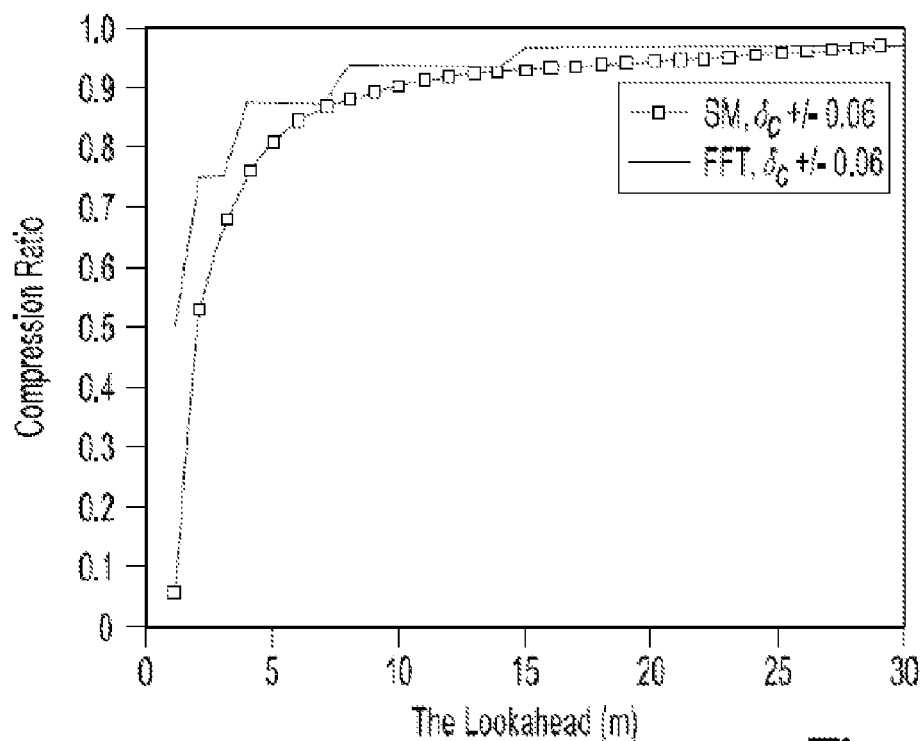
Figure 12D:
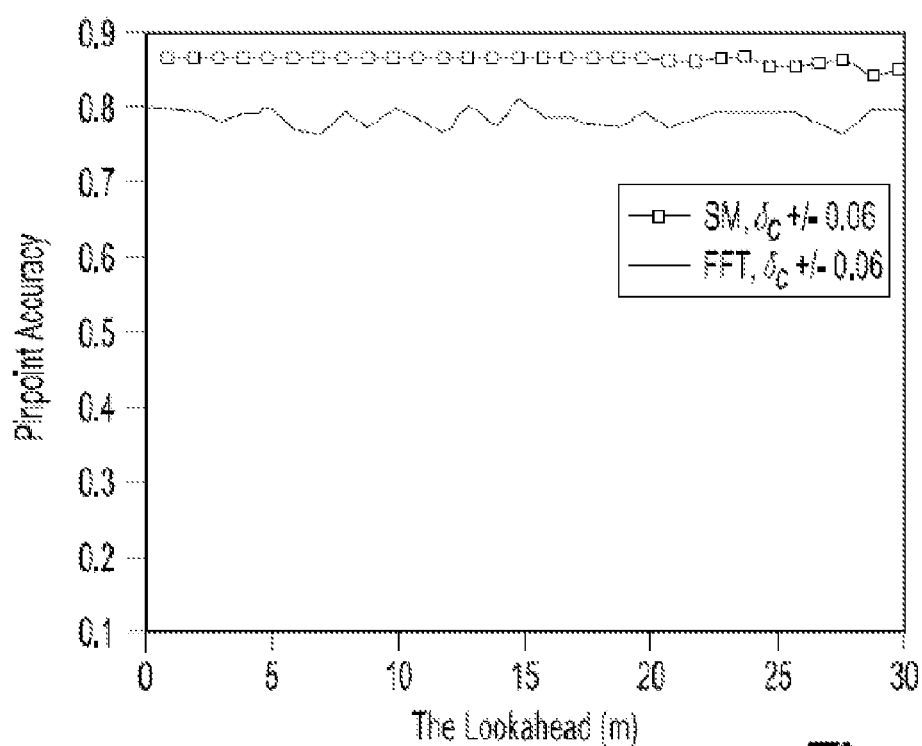

The look-ahead size, m, and its threshold, $\delta_c$, used in the data compression determine the compression ratio which we intend to maximize without losing the detection accuracy. An experiment was conducted under the same condition (i.e., the same database and test set) as when the optimal k was obtained. From the result of the previous experiment, k is set to 23. We then attempt to find the optimal values of m and $\delta_c$. As shown in FIGS. 12A and 12B, when $\delta_c$>0.05, more than 95% storage-savings is achieved. As shown in FIGS. 12C and 12D, the look-ahead parameter correlates more prominently with the compression ratio than PA when $\delta_c$=0.06. As m increases, the compression ratio also increases, while PA is hardly affected. The FFT technique allows a higher compression ratio than the brute-force (BF) comparison because a large portion of samples are converted into constant frequency components.

Accordingly, when $\delta_c$=0.06, the 23/24-point moving average filter and compression with the 20-sample look-ahead (15 samples for FFT) allow the highest PA for hardware (power) measurement, while when $\delta_c$=2, the 5-point moving average and compression with the 5-sample look-ahead are optimal in software (system execution) measurement.

Figure 13:
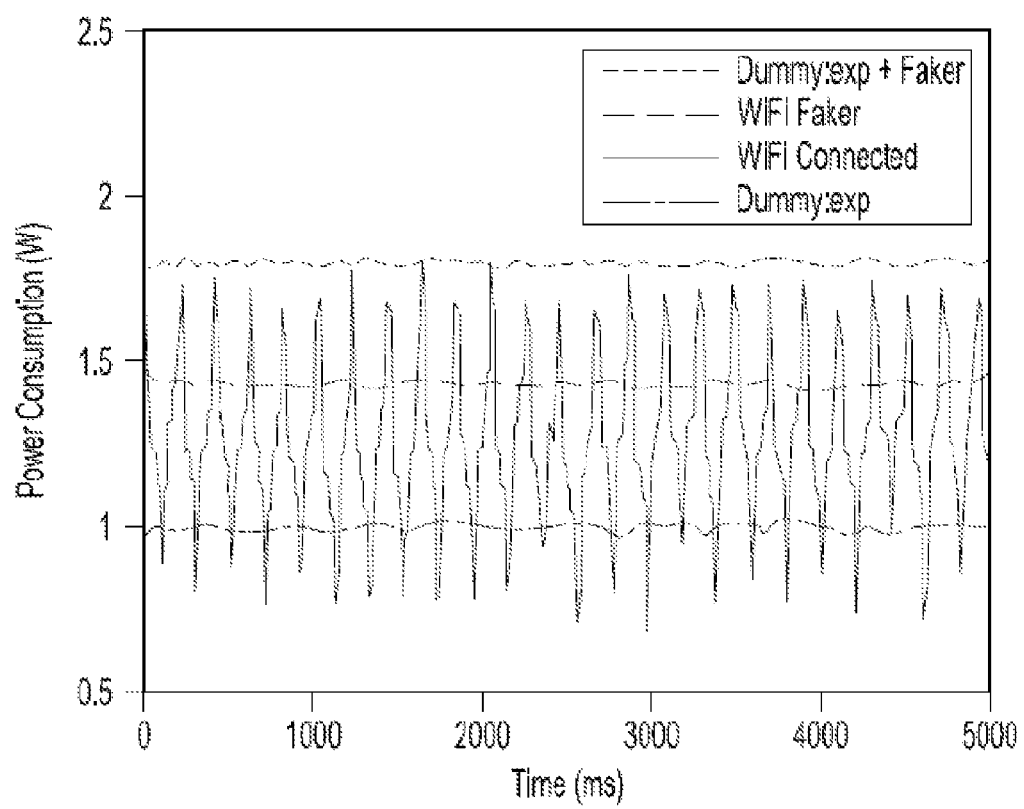
FIG. 13 are graphs that illustrate a comparison of power consumption amongst different applications.

The WiFi faker renders the WiFi-associated system tray icon disabled, thus misleading the user to think that the device is turned off although it is actually on. The WiFi faker makes a request to the power manager for letting the WiFi device adopt the maximum power state, thus draining the battery at the fastest possible rate. The WiFi faker can collaborate with the dummy program that executes an exponential function in a loop. Both aspects of this behavior shown by the WiFi faker and the dummy program are effectively captured by our power-aware detection framework. FIG. 13 shows power-consumption patterns with the WiFi faker and the dummy program executed separately, and in combination. Each of these three patterns (excluding the WiFi-connected pattern) is then represented by a power signature as a malicious application.

To evaluate the accuracy for detecting the battery depletion attacks described above, the following test scenario was set up. Starting with the signature database generated as the basis of the legitimate application group signatures defined in previously, the WiFi faker, the dummy program, and the combination of these two programs, were separately compared using 20-sample sets. First, the WiFi faker was identified as abnormal rather than malicious because the database did not contain a corresponding malware signature. The signature of the WiFi faker was then added to the database, and finally, the three programs were tested. By repeating this test with different combinations of the programs, the database was diversified and populated. As can be seen in Table 2, the WiFi faker (A) is identified with 100% accuracy using Database A, and detected 100% of the time with Databases B and C because the WiFi faker and the other two applications have common power consumption patterns. The dummy program is identified 100% of the time with Database B. In particular, the combination (C) of the two is detected 100% of the time with any of Database A, B, or C. In general, the more diverse the database, the higher the detection accuracy.

TABLE II

| | Tested Malware | | |
|---|---|---|---|
| DB | A | B | C |
| A | 100% | 0% | 100% |
| B | 100% | 100% | 100% |
| C | 100% | 0% | 100% |
| A, B | 100% | 100% | 100% |
| A, C | 100% | 0% | 100% |
| B, C | 100% | 100% | 100% |
| A, B, C | 100% | 100% | 100% |

Four mobile worms—Cabir, Mabir, Commwarrior, and Lasco—which come from the same malware family have common behavior. Likewise, the power signature of one worm can be the basis for detecting the other worms. To evaluate the ability of the system to detect previously unknown worms whose signature is similar to those of previously known worms, the four costume worms were divided into two groups: known-worm and unknown-worm groups. Worms in the known-worm group were executed 5 times to extract their signatures for the database (training set), while worms in the unknown-worm group were executed 15 times to generate a test signature set. Table 3 summarizes the detection accuracy for unknown worms with different combinations of known and unknown worms. The first four rows that correspond to the databases with a single worm signature exhibit the worm closest in behavior to the other. For instance, Cabir (C) and Mabir (M) have a similar power consumption pattern, as do Mabir (M) and Lasco (L). The more diverse worms collected and added to the database, the higher detection accuracy for unknown worms. For instance, the detection accuracy for Commwarrior (W) and Lasco (L) is improved even with a partially-filled database, thus making this technique attractive for resource-limited handhelds.

TABLE III

|     | Tested Worm | | | |
| --- | --- | --- | --- | --- |
| DB | C | M | W | L |
| C | 87% | 93% | 73% | 87% |
| M | 93% | 100% | 80% | 93% |
| W | 47% | 93% | 80% | 87% |
| L | 87% | 93% | 80% | 93% |
| C, M | 93% | 100% | 80% | 93% |
| M, W | 93% | 100% | 80% | 93% |
| W, L | 87% | 93% | 80% | 93% |
| C, M, W | 93% | 100% | 80% | 93% |
| M, W, L | 93% | 100% | 80% | 93% |

In addition to the detection of previously unknown worms, the Bomber whose behavior is similar to that of the WiFi file transfers was also identified with 95% accuracy. Activities that result from the Windows Media Player such as playing two distinct frames with different video codecs—signatures were extracted at the beginning and end of a 5-second execution for each codec—were identified with 100% accuracy.

The moving average filter that was used turned out to be very effective for removing noise, thus extracting a clear power consumption signature from the power consumption history. Table 4 shows the detection accuracy with and without the filter and the compression techniques applied. In the table, the moving average filter and the compression techniques were not applied in the case of C1, while only the filter was applied in the case of C2. Comparing C1 and C2, PA was improved by 22%, achieving a 98% true-positive rate. This enhancement strongly supports the effectiveness of the filter. In addition to the moving average filter, in comparison of C2 and C3, the compression technique is also effective for optimizing memory usage, without degrading the accuracy (the effect of the compression technique will be analyzed shortly). If the number of samples to be matched is 95% of the total samples, the disclosed detection scheme achieves a 99% true-positive rate, while decreasing the false-negative rate down to 0% (in C4). In the case of applying the FFT (C5), the overall accuracy is improved, with the false-negative rate reduced to 2% in comparison with C1 which only achieved 5%.

| Methods | PA | TP* | FN | FP | TP |
| --- | --- | --- | --- | --- | --- |
| (C1) BF w/o opt. | 64% | 29% | 5% | 2% | 93% |
| (C2) BF w/o comp. | 78% | 20% | <1% | 2% | 98% |
| (C3) BF | 78% | 20% | <1% | 2% | 98% |
| (C4) BF (95%). | 76% | 23% | 0% | <2% | 99% |
| (C5) FFT | 73% | 23% | 2% | 3% | 96% |

The simple and powerful compression technique described above was applied. As shown in Table 5, this technique allows the power signature to be compressed by a factor of 21 without losing the detection accuracy (in the case of RI). This compact signature representation also allows the signature matching to require less CPU time. For instance, the data processing needed for the compression and the BF comparison (100% samples matching) requires less CPU time than the case without the compression by 71% (in the case of R2). When the FFT method is applied, the data processing including the FFT computation is estimated to be 1.6 times faster than the case without this optimization, resulting in only 63% of CPU time required (in the case of R3). Comparing the FFT method with the BF approach, therefore, as we expected, the data processing with the FFT method applied is estimated to be 1.3 times faster than that with the BF approach applied, because most of the transformed data as a result of the FFT are zero or the same constant frequency components, simplifying the distance metric computation.

TABLE V

| Ratio | Value |
| --- | --- |
| (R1) Compression ratio | 21.3 |
| (R2) CPU gain ratio (BF) | 1.4 |
| (R3) CPU gain ratio (using FFT) | 1.6 |

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A system for detecting malware applications residing on a mobile device powered by a battery, comprising:
    a data store that stores a plurality of known power signatures, each of the power signatures signifying a power consumption pattern of an application;
    a power monitoring module, implemented as computer executable instructions executed by a computer processor, that measures power drawn from the battery, wherein the power monitoring module includes
        a current measurement device interposed between the battery and a load of the mobile device and operable to output a current proportional to a current drawn by the mobile device;
        a capacitor coupled between the current measurement device and ground and configured to receive the current output by the current measurement device; and
        a microcontroller configured to measure voltage stored by the capacitor;
    a data analysis module, implemented as computer executable instructions executed by a computer processor, that receives power measures from the power monitor and extracts a power history signature from the power measures, the data analysis module compares the power history signature with a plurality of known power signatures and initiates a protective operation if the power history signature matches one or more of the known power signatures.

2. The system of claim 1 wherein the power monitoring module measure voltage and current drawn from the battery and calculates power by integrating product of the current and the voltage sampled over a period of time.

3. The system of claim 2 wherein the power monitoring module samples at random time intervals.

4. The system of claim 1 wherein the data analysis module filters power measurements using a moving average filter.

5. The system of claim 1 wherein the data analysis module compresses power measurements using a compression algorithm.

6. The system of claim 1 wherein the data analysis module computes a similarity measure between the power history signature and plurality of known power signatures.

7. The system of claim 6 wherein the data analysis module computes a chi-square distance between the power history signature and each of the plurality of known power signatures.

8. The system of claim 7 wherein the data analysis module initiates a protective operation when the chi-square distance is less than a threshold.

9. The system of claim 6 wherein the data analysis module initiates a protective operation when the similarity measure for given known power signature is less than a threshold and the given known power signature is labeled as malicious, where each of the plurality of known power signatures is labeled as legitimate or malicious.

10. The system of claim 9 wherein the data analysis module updates the data store with the power history signature when the similarity measure for given known power signature is less than a threshold and the given known power signature is labeled as malicious, where each of the plurality of known power signatures is labeled as legitimate or malicious.

11. The system of claim 1 wherein the power monitoring module compiles a history of power consumption by the mobile device over a period of time.

12. The system of claim 11 further comprises a usage monitor associated with the power monitoring module that monitors an amount of power being used by the mobile device and compiles the power consumption history when the amount of power used, in relation to an amount of expected power usage, exceeds a predetermined threshold.

13. The system of claim 12 wherein the usage monitor determines an operating state of the mobile device and compares the amount of power used to an amount of expected power usage associated with the current operating state of the mobile device, where the mobile device operates in a plurality of operating states having different amounts of expected power usage.

14. The system of claim 11 wherein a usage monitor associated with the power monitoring module that monitors an amount of power being used by the mobile device and compiles the power consumption history whenever a context switch occurs in an operating system executing on the mobile device.

15. The system of claim 1 wherein the power monitoring module further includes a transistor coupled in parallel with the capacitor, where the microcontroller controls the transistor to discharge the capacitor between voltage measurements.

16. The system of claim 1 wherein a protective operation includes at least one of removing the malware application, quarantining the malware application, generating an alert to an operating system of the device, or generating an alert to a user of the device.

17. The system of claim 1 wherein the data analysis module resides on a server remote from the mobile device and the power monitoring module resides on the mobile device and transmits the power measures over a communication link to the data analysis module.

18. The system of claim 1 wherein the data store resides on a server.

19. A mobile computing device powered by a battery, comprising:

a data store for storing a plurality of known power signatures, each of the power signatures signifying a power consumption pattern of an application;
a power monitoring module that measures power drawn from the battery and generates a power consumption history indicating amounts of power drawn from the battery at various times, wherein the power monitoring module includes
   a current measurement device interposed between the battery and a load of the mobile computing device and operable to output a current proportional to a current drawn by the mobile computing device;
   a capacitor coupled between the current measurement device and ground and configured to receive the current output by the current measurement device; and
   a microcontroller configured to measure voltage stored by the capacitor;
a data analysis module embodied as computer executable instructions in computer memory receives the power consumption history from the power monitoring module and extracts a power signature form the power measure,
the data analysis module computes a similarity measure between the power signature and each of the plurality of known power signatures and initiates a protective operation when the similarity measure between the power signature and a known power signature corresponding to a malware application exceeds a threshold.

20. The device of claim 19 wherein the power monitoring module measures a power drawn from the battery by measuring a voltage outputted by the battery and a current generated by the battery.

21. The device of claim 19 further comprising a usage monitor associated with the power monitoring module that monitors an amount of power being used by the mobile device and that signals to the power monitoring module to generate the power consumption history when the amount of power used, in relation to an expected amount of power usage, exceeds a predetermined threshold.

22. The device of claim 19 further comprising a noise filter associated with the data analysis module that filters high-frequency noise from the power consumption history.

23. The device of claim 19 further comprising a data compression module associated with the data analysis module that reduces the size of the power consumption history using a compression algorithm.

24. The device of claim 19 wherein a protective operation includes at least one of removing the malware application, quarantining the malware application, generating an alert to an operating system of the device, or generating an alert to a user of the device.

25. The device of claim 19 wherein the data analysis module measures a chi-square distance between the power signature and the known power signatures.

26. The device of claim 25 wherein the data analysis module determines a match between the power signature and a closest known power signature when the chi square distance is less than a predetermined threshold.

27. The device of claim 26 wherein the data analysis module determines a non-match between the power signature and the closest known power signature when the chi square distance is greater than a predetermined threshold.

28. The system of claim 19 wherein the power monitoring module further includes a transistor coupled in parallel with the capacitor, where the microcontroller controls the transistor to discharge the capacitor between voltage measurements.

* * * * *

UNITED STATES PATENT AND TRADEMARK OFFICE
CERTIFICATE OF CORRECTION

PATENT NO. : 8,332,945 B2
APPLICATION NO. : 12/793929
DATED : December 11, 2012
INVENTOR(S) : Hahnsang Kim and Kang G. Shin It is certified that error appears in the above-identified patent and that said Letters Patent is hereby corrected as shown below:

In the Specification:

Column 3, line 19, "FIG. 10A-10C" should be --FIGS. 10A-10C--.

Column 3, line 48, "signature" should be --signatures--.

Column 4, line 56, "design" should be --designed--.

Column 5, line 63, "fuction" should be --function--.

Column 6, line 10, "envision" should be --envisioned--.

Column 10, line 46, after "returns" insert --to--.

Column 11, line 46, "WiFI" should be --WiFi--.

Column 11, line 56, after "SetDevicePower()" insert --.--.

In the Claims:

Column 20, line 21, claim 19, "signature form" should be --signature from--.

Column 20, line 56, claim 26, "chi square" should be --chi-square--.

Column 20, line 60, claim 27, "chi square" should be --chi-square--.

Signed and Sealed this
Sixteenth Day of April, 2013

Teresa Stanek Rea
*Acting Director of the United States Patent and Trademark Office*